US012753861B2

(12) United States Patent
Deaton et al.

(10) Patent No.: US 12,753,861 B2
(45) Date of Patent: Oct. 6, 2026

(54) DURABLE, FLEXIBLE, LIGHTWEIGHT WATER HOSE WITH MULTIPLE BONDED LAYERS

(71) Applicant: TEKNOR APEX COMPANY, Pawtucket, RI (US)

(72) Inventors: Olivia French Deaton, Lakeland, TN (US); Timothy L. Chapman, Stanton, TN (US); Butch Crittenden, Three Way, TN (US); Paul Kroushl, Franklin, MA (US)

(73) Assignee: TEKNOR APEX COMPANY, Pawtucket, RI (US)

( * ) Notice: Subject to any disclaimer, the term of this patent is extended or adjusted under 35 U.S.C. 154(b) by 679 days.

(21) Appl. No.: 18/113,953

(22) Filed: Feb. 24, 2023

(65) Prior Publication Data

US 2024/0077151 A1 Mar. 7, 2024

Related U.S. Application Data

(60) Provisional application No. 63/316,610, filed on Mar. 4, 2022.

(51) Int. Cl.
*F16L 11/08* (2006.01)

(52) U.S. Cl.
CPC .................................. *F16L 11/087* (2013.01)

(58) Field of Classification Search
CPC ...... F16L 11/087; F16L 11/081; F16L 11/082; F16L 11/088; F16L 11/083; F16L 11/085; F16L 11/00
See application file for complete search history.

(56) References Cited

U.S. PATENT DOCUMENTS

| | | | | |
|---|---|---|---|---|
| 3,913,624 A * | 10/1975 | Ball | B29C 70/10 138/132 |
| 4,007,070 A | 2/1977 | Busdiecker | |
| 4,306,591 A * | 12/1981 | Arterburn | D04C 1/02 138/124 |
| 5,477,888 A | 12/1995 | Mezzalira | |
| 6,199,594 B1 | 3/2001 | Mezzalira | |
| 6,948,527 B2 | 9/2005 | Ragner et al. | |
| 7,549,448 B2 | 6/2009 | Ragner | |

(Continued)

FOREIGN PATENT DOCUMENTS

| | | | | |
|---|---|---|---|---|
| CN | 201884813 U * | 6/2011 | |
| CN | 110206943 A * | 9/2019 | F16L 11/087 |
| GB | 2282777 A | 4/1995 | |

OTHER PUBLICATIONS

Screenshot of Genplex NPL, wayback machine dated to Apr. 2021 (Year: 2025).*

(Continued)

*Primary Examiner* — Kenneth Rinehart
*Assistant Examiner* — Haotian Lu
(74) *Attorney, Agent, or Firm* — Hudak, Shunk & Farine Co. LPA

(57) ABSTRACT

A water hose particularly suitable for home and garden use, as well as light industrial or commercial use. The hose has a composite form and contains multiple bonded layers that synergistically contribute to durability, flexibility at a wide range of temperatures, kink resistance, and excellent flow rates while being relatively light in weight as compared to some conventional multi-layer composite hoses.

19 Claims, 3 Drawing Sheets

(56) References Cited

U.S. PATENT DOCUMENTS

| | | | | |
|---|---|---|---|---|
| 8,291,942 | B2 | 10/2012 | Berardi | |
| 8,371,143 | B2 | 2/2013 | Ragner | |
| 8,479,776 | B2 | 7/2013 | Berardi | |
| 8,757,213 | B2 | 6/2014 | Berardi | |
| 8,770,233 | B2 | 7/2014 | Mezzalira et al. | |
| 8,776,836 | B2 | 7/2014 | Ragner et al. | |
| 8,936,046 | B2 | 1/2015 | Ragner | |
| 10,359,131 | B2 | 7/2019 | Ragner | |
| 11,022,238 | B2 | 6/2021 | Block et al. | |
| 2001/0008150 | A1 | 7/2001 | Lerary et al. | |
| 2012/0145275 | A1 * | 6/2012 | Seebold | B32B 25/042 264/209.6 |
| 2014/0100311 | A1 | 4/2014 | Cai et al. | |
| 2014/0116563 | A1 * | 5/2014 | Fernando | B32B 27/08 138/137 |
| 2019/0186656 | A1 * | 6/2019 | Kozak | B29C 53/58 |
| 2019/0194440 | A1 * | 6/2019 | Rong | B32B 25/14 |
| 2021/0278018 | A1 | 9/2021 | Miller et al. | |
| 2022/0258440 | A1 * | 8/2022 | Mitsch | F16L 11/083 |

OTHER PUBLICATIONS

Screenshot of Kanacademy NPL, copyrighted 2022 (Year: 2022).*

Downloadable chart which came from Plastemart NPL (Year: 2014).*

Plastemart NPL screenshot, copyrighted 2014 (Year: 2014).*

NOAA's page "Cameo Chemicals", Wayback Machine dated to Jun. 2021, printed Jan. 2026 https://web.archive.org/web/20210620230722/https://cameochemicals.noaa.gov/chemical/20941 (Year: 2026).*

Universal Selector NPL, dated to Aug. 2018 https://resimport.com.br/painel/arquivos/627a5f0370.pdf (Year: 2018).*

USDA NPL, published Aug. 1997. https://www.fs.usda.gov/t-d/programs/fire/documents/5100_185e.pdf (Year: 1997).*

Molecular weight and solution viscosity characterization of PVC, Journal of Vinyl Technology, Jun. 1993, vol. 15, No. https://4spepublications.onlinelibrary.wiley.com/doi/pdf/10.1002/vnl.730150211 (Year: 1993).*

International Search Report dated Jul. 20, 2023 for family member application PCT/US2023/013695.

* cited by examiner

DURABLE, FLEXIBLE, LIGHTWEIGHT WATER HOSE WITH MULTIPLE BONDED LAYERS

FIELD OF THE INVENTION

The present invention relates to a water hose particularly suitable for home and garden use, as well as light industrial or commercial use. The hose has a composite form and contains multiple bonded layers that synergistically contribute to durability, flexibility at a wide range of temperatures, kink resistance, and excellent flow rates while being relatively light in weight as compared to some conventional multi-layer composite hoses.

BACKGROUND OF THE INVENTION

Many different types or styles of hoses are used to transport water, for example conventional hoses, longitudinally expanding hoses, and hybrid hoses, from a fixed connection such as a spigot, valve or the like.

Conventional flexible hoses typically have a substantially fixed longitudinal length and a relatively low radial expansion upon internal application of fluid or water pressure. They can have a single layer construction, but many include a layered construction having a water-impermeable inner core or tube, a textile reinforcement and an outer cover, wherein the adjacent layers are bonded to each other. Conventional hoses are described in various patents and publications, see for example: U.S. Pat. Nos. 8,770,233, and 11,022,238, and U.S. Publication 2021/0278018.

Longitudinally expandable hoses can increase in length multiple times, as compared to the length of the hose in an unpressurized or contracted state. In some embodiments, expandable hoses have a construction that includes a jacket of a substantially fixed length that surrounds an expandable fluid or water conveying tube. Often, such hoses are also radially expandable to some extent.

Longitudinally expandable hoses are commercially available from a number of sources. The hoses are also described in various patents and publications, see for example: U.S. Pat. Nos. 6,948,527; 7,549,448; 8,291,942; 8,371,143; 8,479,776; 8,757,213; 8,776,836; 8,936,046 and 10,359,131.

Hybrid hoses such as Teknor Apex's ZERO-G® hose combine features from both conventional hoses and longitudinally expandable hoses. Such hoses can include an inner tube having a substantially fixed longitudinal length and an outer jacket of substantially fixed length. During use, the inner tube is radially expandable within the jacket, with the jacket not bonded, connected or attached to the inner tube between end couplers of the hybrid hose assembly.

In view of the above, there is still a need for hoses, such as garden and watering hoses, that are durable, flexible, lightweight and kink resistant, all while permitting a desirable flow rates therethrough.

SUMMARY OF THE INVENTION

These needs are solved by the hoses of the present invention which are further described herein. The hoses utilize a multi-layer construction to provide desirable features that are of great value to end users. Compared to hoses that use a textile outer jacket, hoses of the invention are easier to clean and keep clean. Methods for producing the hoses are also described.

In one aspect, a hose for lawn and garden use is disclosed, comprising an inner tube having a longitudinal length and an inner surface defining a water passage between a first and a second end of the hose, the inner tube comprising a polymer composition comprising a first polyvinyl chloride polymer and an elastomer, wherein the first polyvinyl chloride polymer is present in a major amount by weight based on a total weight of the polymer composition of the inner tube; a reinforcement layer bonded to an outer surface of the inner tube, wherein the reinforcement layer comprises i) a textile layer comprising yarns and ii) a tie layer comprising a second polyvinyl chloride polymer different that the first polyvinyl chloride polymer; an outer layer bonded to an outer surface of the reinforcement layer and comprising a polymer composition comprising a third polyvinyl chloride polymer and an elastomer, wherein the third polyvinyl chloride polymer is present in a major amount by weight based on a total weight of the outer layer polymer composition, wherein the third polyvinyl chloride polymer is different than the second polyvinyl chloride polymer; and:

- wherein the second polyvinyl chloride polymer of the reinforcement layer has an intrinsic viscosity less than the intrinsic viscosity of the first polyvinyl chloride polymer and the third polyvinyl chloride polymer, or
- wherein the first polyvinyl chloride polymer and the third polyvinyl chloride polymer have a K-value greater than the second polyvinyl chloride polymer, or
- wherein the inner tube and the outer layer each have a hardness less than the hardness of the tie layer; or
- a combination thereof.

In a further aspect, the textile layer is embedded in the tie layer, wherein the textile layer does not have direct contact with the inner tube and the outer layer.

In an additional aspect, a difference in length of a 25 foot length of the hose, in an unpressurized state or ambient state is less than 25% as compared to the length of the hose in a pressurized state at 80 psi, or less than 20% at 60 psi or less, or less than 15% at 50 psi or less, or less than 10% at 30 psi or less.

In yet another aspect, a 50 foot length of the hose pressurized with water at 72.5 psi and allowed to equilibrate for 30 minutes retracts less than 15%.

In a further aspect, the inner tube elastomer comprises nitrile rubber, and wherein nitrile rubber is present in an amount from about 40 to less than 100 parts based on 100 parts by weight of the first polyvinyl chloride polymer.

In an additional aspect, the first polyvinyl chloride polymer has an intrinsic viscosity that ranges from about 0.68 to about 1.25 and a K-value that ranges from about 57 to about 78, wherein the second polyvinyl chloride polymer has an intrinsic viscosity that ranges from about 0.50 to about 1.12 and a K-value that ranges from about 50 to about 73, and wherein the third polyvinyl chloride polymer has an intrinsic viscosity that ranges from about 0.68 to about 1.25 and a K-value that ranges from about 57 to about 78.

In yet another aspect, the first polyvinyl chloride polymer has an intrinsic viscosity that ranges from about 0.90 to about 1.15 and a K-value that ranges from about 67 to about 73, wherein the second polyvinyl chloride polymer has an intrinsic viscosity that ranges from about 0.60 to about 0.85 and a K-value that ranges from about 52 to about 75, and wherein the third polyvinyl chloride polymer has an intrinsic viscosity that ranges from about 0.90 to about 1.15 and a K-value that ranges from about 67 to about 73.

In a further aspect, the inner tube and outer layer each comprise a plasticizer, and wherein the reinforcement layer is free of an elastomer.

In an additional aspect, the first polyvinyl chloride polymer has a hardness that ranges from 40 to 80 Shore A, wherein the second polyvinyl chloride polymer has a hardness that ranges from 70 to 100 Shore A and the third polyvinyl chloride polymer has a hardness than ranges from 40 to 80 Shore A.

In yet another aspect, the first polyvinyl chloride polymer has a hardness that ranges from 55 to 70 Shore A, wherein the second polyvinyl chloride polymer has a hardness that ranges from 77 to 84 Shore A and the third polyvinyl chloride polymer has a hardness than ranges from 55 to 75 Shore A.

In a further aspect, a method for producing the hose according to any of the aspects above is disclosed, comprising the steps of coextruding the inner tube and a first layer of the tie layer, wherein the first layer of the tie layer is present on an outer surface of the inner tube; weaving the textile layer on the first layer of the tie layer; and coextruding a second layer of the tie layer onto the textile layer and the outer layer onto the second layer of the tie layer to form the hose.

For the avoidance of doubt, it should be clear to one of ordinary skill in the art that one or more of the above-defined aspects are combinable in various embodiments of the invention.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
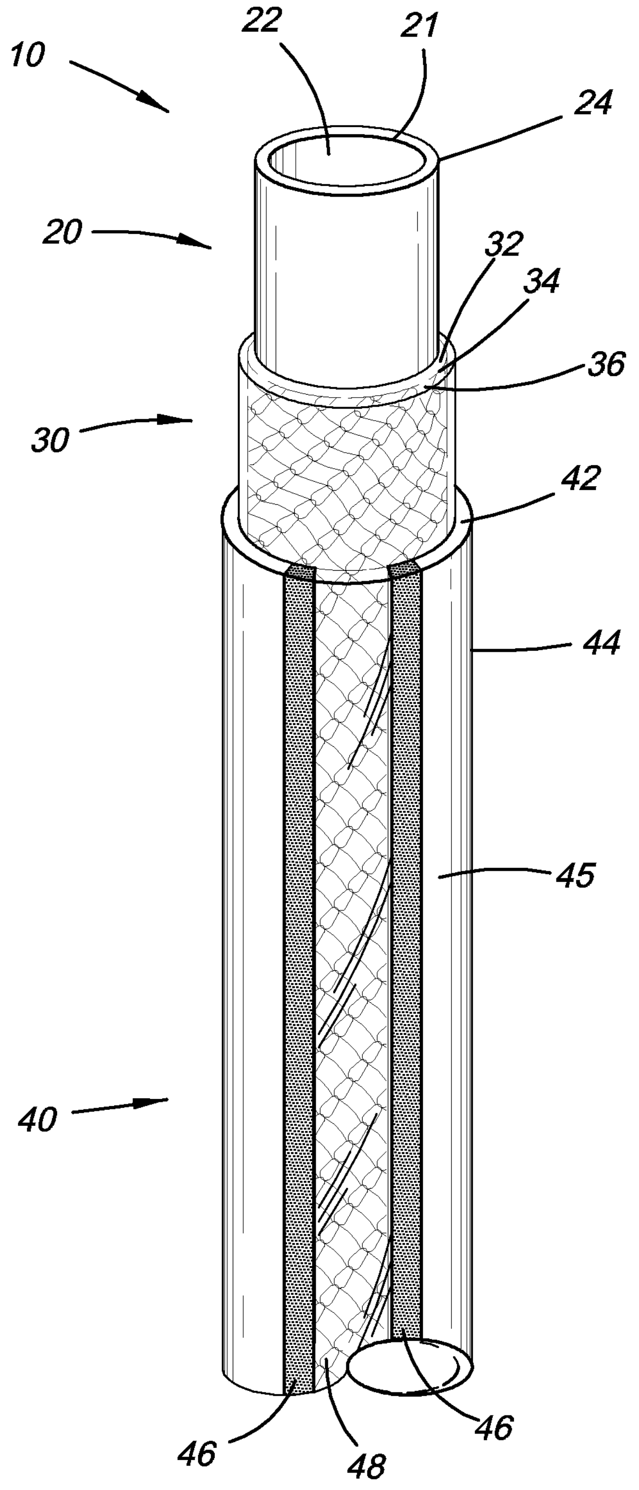
FIG. 1 is a perspective view of one embodiment of a hose of the present invention particularly illustrating individual layers of the composite.

In this specification, all numbers disclosed herein designate a set value, individually, in one embodiment, regardless of whether the word "about" or "approximate" or the like is used in connection therewith. In addition, when the term such as "about" or "approximate" is used in conjunction with a value, the numerical range may also vary, for example by 1%, 2%, 5%, or more in various other, independent, embodiments.

Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of a component in a composition and properties of specific components.

As utilized herein, the term "ambient", "ambient state" or the like reference a measurement taken of a particular structure or feature of the hose or part of the hose in a non-pressurized state, at normal atmospheric pressure.

The term "pressurized", "pressurized state" or the like refer to a measurement taken of a particular structure or feature of the hose or part of the hose in a state wherein a first end of the hose is connected to a pressure source, such as but not limited to, a spigot or other water source; or an air or gas source; having a pressure between 30 and 80 psi and a second end of the hose is operatively connected to a hose nozzle or other device having a valve in a closed position, whereby water pressure within the hose has increased from an ambient pressure.

The term "after the pressurized state", "after release of pressure", or like refers to a measurement taken at a time after a hose has achieved the pressurized state and during active flow of water through the hose.

In one embodiment, flow rate testing of a hose is performed by allowing the hose sample to equilibrate at a water pressure of about 65 PSI (4.5 bar) for 15 minutes. After the conditioning period, water is allowed to flow through the hose, with the water supply set to deliver about 8.0 gallons per minute (30.3 liters per minute). The amount of water flowing out of the hose is measured and recorded.

As used herein, reference to "one embodiment" or "an embodiment" means that a particular element, feature, structure or characteristic described in connection with the embodiment is included in at least one embodiment of the invention. Use of the noted phrases in various places in the specification are not necessarily referencing the same embodiment.

When utilized herein, the term "polymer" or the like encompasses a homopolymer, namely polymers formed from the same monomers, as well as copolymers, namely polymers formed from two or more different monomers. The term also encompasses thermoplastic, elastomeric, and thermoset materials.

The hoses, and hose assemblies of the present invention including the hoses, contain multiple bonded layers between an inner surface of the hose adapted to contact a fluid flowable through the hose and an outer surface of the hose. Thus, the hoses are readily distinguished from longitudinally expandable hoses and hybrid hoses which contain a jacket, outer layer or other layer that is not connected to at least one other layer of the hose between ends of the hose or fittings connected to ends of the hoses.

The presence of multiple bonded layers in the inventive hoses contribute to the durability, flexibility and kink resistance. The composite, multi-layer hoses have an advantage of being light in weight and constructed from polymer compositions within each layer that allow for desirable water output or flow for a user. The hoses also have a polymeric outer surface which is easy to clean and keep clean. Beneficially, the hoses can be sold and purchased in standard lengths typically desired by consumers.

The difference in length of a hose or section of a hose, such as a 25 foot length of hose, in an unpressurized state or ambient state is less than 25% in some embodiments as compared to the length of the respective hose or section in a pressurized state at 80 psi or less than 20% at 60 psi or less, or less than 15% at 50 psi or less, or less than 10% at 30 psi or less.

In other embodiments, the hose or section of a hose in a pressurized state can have a length less than the length of the hose in an unpressurized or ambient state. That is, in some embodiments, the hose or section of a hose can slightly retract under pressure. The greater retraction is achieved generally relative to internal pressure asserted on the hose. For example, in one embodiment a 50 foot length of hose pressurized at 72.5 psi (5 bar), and allowed to equilibrate for 10 min, 30 min or 60 min generally retracts less than 20%, desirably less than 15%, and preferably less than about 10%.

Figure 2:
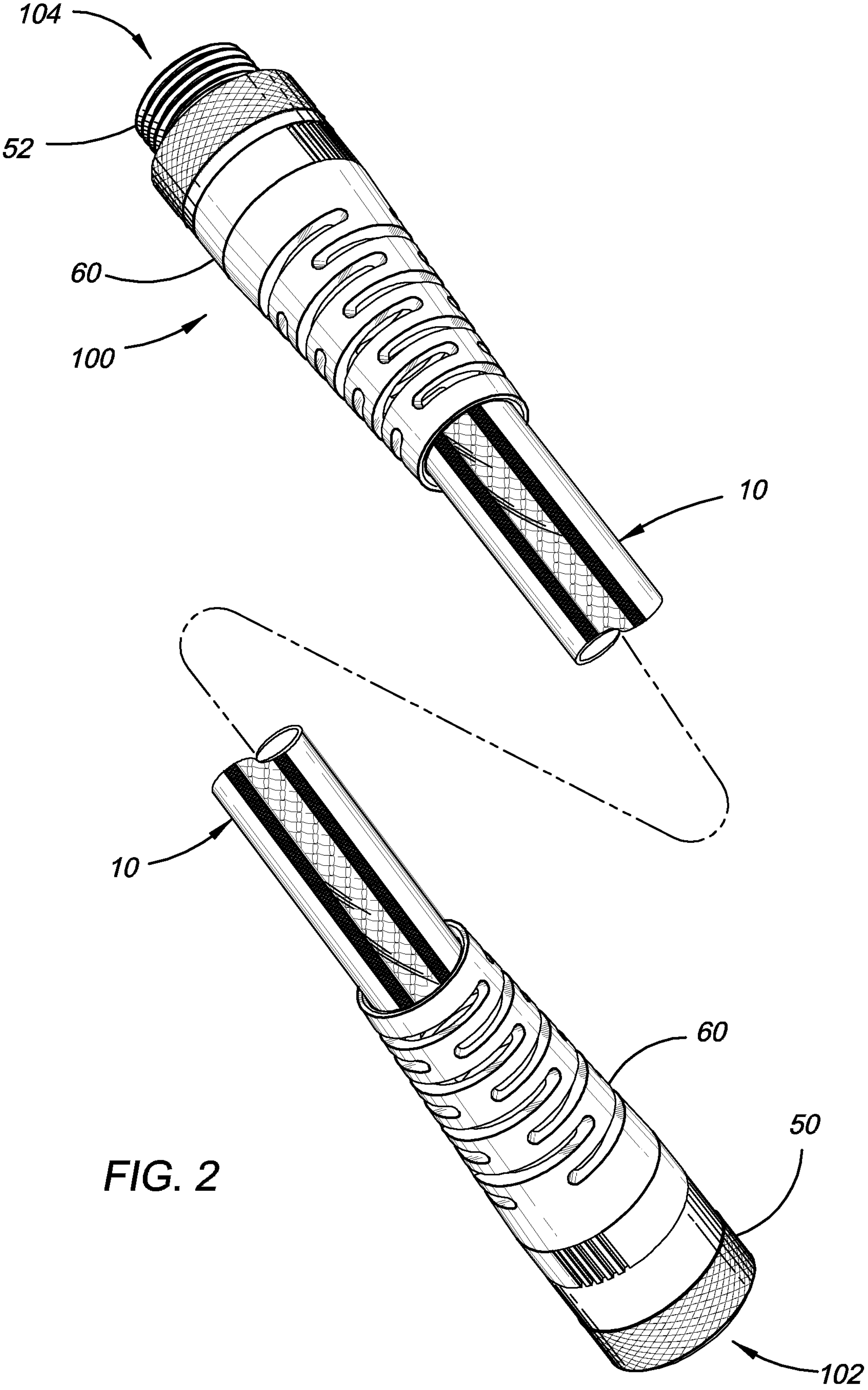
FIG. 2 is a plan view of one embodiment of a hose assembly of the present invention.
Figure 3:
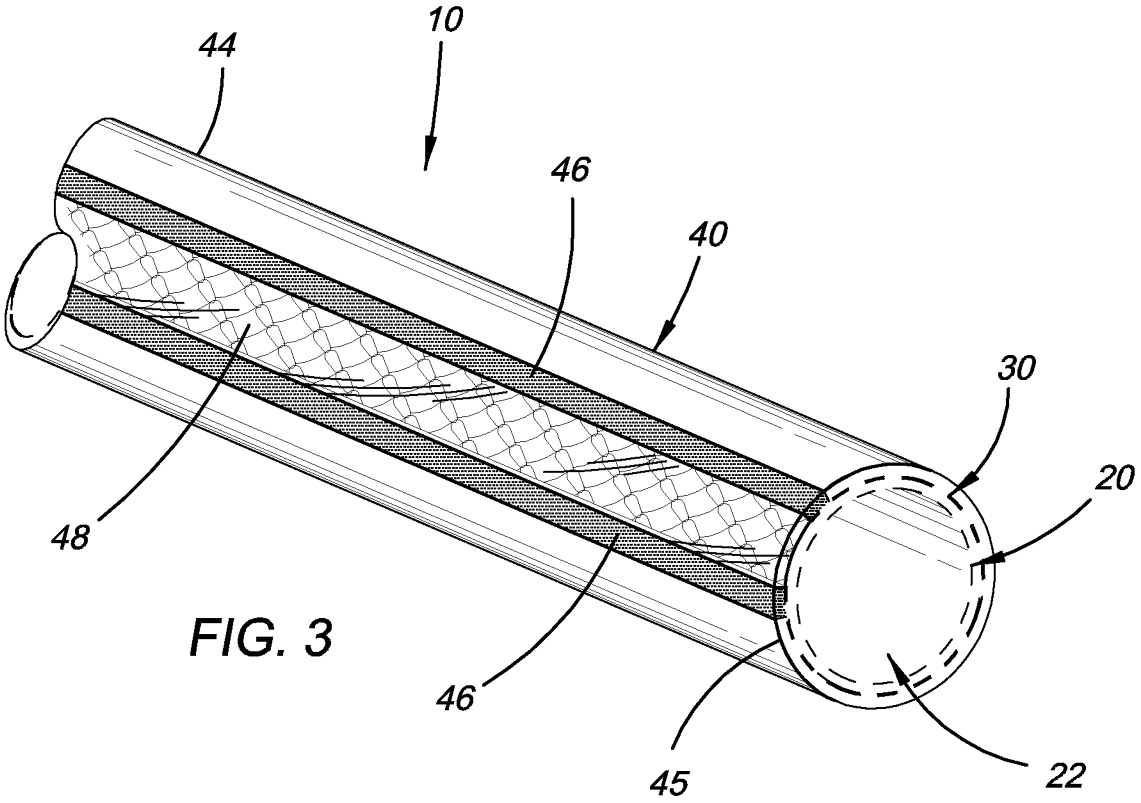
FIG. 3 is a perspective view of one embodiment of a hose of the present invention.
Figure 4:
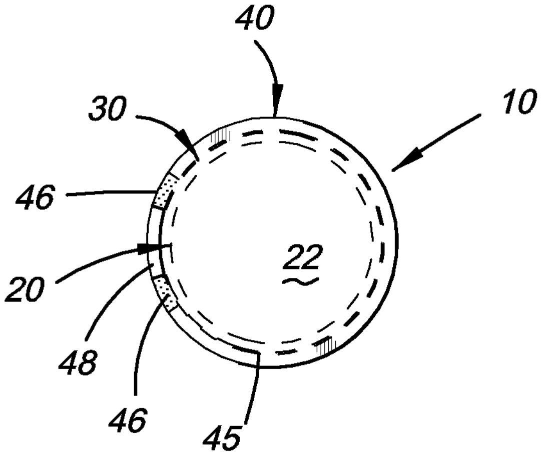
FIG. 4 is a cross-sectional view of the hose illustrated in FIG. 3.

Referring now to the drawings, wherein like reference numbers refer to like or similar parts throughout the several views, a hose 10 is illustrated in FIGS. 1 through 4. In FIG. 1, portions of the outer layer 40 and reinforcement layer 30 have been cut away from inner layer 20 in order to show and better illustrate the multi-layer construction of the hose. FIGS. 3 and 4 illustrate further views of hose 10 and the outer layer 40, reinforcement layer 30, and inner layer 20 thereof.

As shown in FIG. 2, hose 10 is part of a hose assembly 100 having an inlet 102 and an outlet 104 with a fluid passage 22 being located therebetween. The hose extends between and is connected to a pair of fittings or couplers, for example female coupler 50 and male coupler 52. A strain relief device 60 is connected to each of female coupler 50 and male coupler 52 in order to reduce strain on the end of the hose connected to a respective coupling. Strain relief device 60 provides bending resistance to the hose 10 running therethrough due to the presence of multiple openings on the strain relief device, wherein the body of the device flexes upon bending until the size of a central area of the opening is reduced and adjacent walls of the openings contact each other. Upon release of the bending stress, the body substantially returns to its original shape.

Inner Tube

Inner tube 20 includes an inner surface 21 that forms fluid passage 22 which extends the length of hose 10. Inner tube 20 also includes an outer surface 24 which is bonded to reinforcement layer 30. The inner tube 20 includes a polymer composition comprising two or more polymers, with at least one polymer being a thermoplastic polymer. In highly preferred embodiments, the polymer compositions comprises both a thermoplastic polymer and an elastomer.

In a preferred embodiment, the thermoplastic polymer is present in a major amount by weight based on the total weight of the polymer composition in the inner tube. The thermoplastic polymer forms a matrix in which any other polymers present are dispersed, for example in the form of particles. When the polymer composition comprises a thermoplastic polymer and an elastomer, the thermoplastic polymer is considered a matrix material and the elastomer is dispersed therein, preferably in the form of particles. That said, when higher amounts of non-thermoplastic polymers are present, co-continuous phases may be present.

Non-limiting examples of suitable thermoplastic polymers suitable for use in the inner tube of the invention include, but are not limited to, one or more of polyolefins; randomly chlorinated polyolefins; polyester-polyether block copolymer; polylactic acid; vinyl polymers; polystyrene; polysilicones; polyurethanes; acrylonitrile ethylene styrene (AES); and halogenated thermoplastic polymers such as polyvinyl chloride; and blends thereof.

In various embodiments of the present invention, the inner tube comprises a polyvinyl chloride polymer. The term "polyvinyl chloride polymer", as used herein, is a vinyl chloride polymer, such as polyvinyl chloride (PVC), e.g. a polyvinyl chloride homopolymer, or a vinyl chloride copolymer. Further, the polyvinyl chloride polymer may include copolymerized units of one or more additional comonomers, which comonomers will typically account for up to 20 weight percent of the copolymer. Examples of suitable comonomers include one or more of $C_2$-$C_6$ olefins, for example ethylene and propylene; vinyl esters of straight chain or branched $C_2$-$C_4$ carboxylic acids, such as vinyl acetate, vinyl propionate, and vinyl 2-ethyl hexanoate; vinyl halides, for example vinyl fluoride, vinylidene fluoride or vinylidene chloride; vinyl ethers, such as vinyl methyl ether and butyl vinyl ether; vinyl pyridine; unsaturated acids, for example maleic acid, fumaric acid, methacrylic acid and their mono- or diesters with $C_1$-$C_{10}$ mono- or dialcohols; maleic anhydride, maleic acid imide as well as the N-substitution products of maleic acid imide with aromatic, cycloaliphatic and optionally branched aliphatic substituents; acrylonitrile and styrene. The vinyl chloride copolymer includes, for example, vinyl chloride/vinyl acetate copolymer, vinyl chloride/vinylidene chloride copolymer, or a vinyl chloride/ethylene copolymer.

The polyvinyl chloride polymer may also include graft copolymers of vinyl chloride, for example, ethylene copolymers, such as ethylene vinyl acetate, and ethylene copolymer elastomers, such as EPDM (copolymers comprising copolymerized units of ethylene, propylene and dienes) and EPR (copolymers comprising copolymerized units of ethylene and propylene) that are grafted with vinyl chloride.

Further, the polyvinyl chloride polymer may also include a polymer blend of the above-mentioned vinyl chloride polymer or vinyl chloride copolymer with one or more other miscible or compatible polymers including, but not limited to, chlorinated polyethylene, thermoplastic polyurethane, olefin polymers such as a methacryl polymer or acrylonitrile-butadiene-styrene polymer (ABS resin).

Commercially available polyvinyl chloride polymers are available from sources such as Formosa, Mexichem, Oxy, Shintech and Westlake under various designations.

Molecular weight is characterized by an intrinsic viscosity (IV) value of the polymer, such as polyvinyl chloride. The polymer, preferably polyvinyl chloride polymer, utilized in the inner tube has an IV that ranges generally from about 0.68 to about 1.25, desirably from about 0.80 to about 1.20, and preferably from about 0.90 to about 1.15 when measured according to ASTM D-1243. The IV of the inner tube polymer, such as polyvinyl chloride is greater than the IV of the polymer, such as polyvinyl chloride, of the tie layer. The use of lower IV polymer, preferably, polyvinyl chloride, in the tie layer has been found to provide excellent bondability between the tie layer, the inner tube and outer layer.

The polymer, preferably polyvinyl chloride polymer, of the inner tube is also characterized by a K-value. In various embodiments, the K-value ranges generally from about 57 to about 78, desirably from about 60 to about 75, and preferably from about 67 to about 73 when measured according to ISO 1628. The K-value of the polymer, such as polyvinyl chloride, of the inner tube is greater than the K-value of the polymer, preferably polyvinyl chloride, of the tie layer. The K-values represent a function of the average molecular weight, the degree of polymerization and the intrinsic viscosity.

In order to impart the desired characteristics to the inner tube of the hose assembly of the invention, the thermoplastic polymer is present in an amount generally described as being 100 parts per hundred resin (phr). As such, the thermoplastic polymer, i.e. polyvinyl chloride, is listed in the amount of 100 phr. Thus, other components of the compositions of the inner tube are expressed as amounts based on 100 phr, i.e. 100 parts of the thermoplastic polymer.

The inner tube also includes an elastomer in preferred embodiments. The elastomer can be a polar rubber or a non-polar rubber. The polarity of the thermoplastic polymer and elastomers can be matched by one of ordinary skill in the art. The elastomer includes one or more of a natural rubber and a synthetic rubber. As known in the art, natural rubber is formed from the diene isoprene (2-methyl-1,3-butadiene). Examples of conjugated dienes suitable for forming synthetic rubbers include, but are not limited to, isoprene, 1,3-butadiene and chloroprene. Optionally, the rubbers can be formed from dienes and monomers which are not dienes. For example, styrene-butadiene rubber is a copolymer of 1,3-butadiene and styrene. Nitrile rubber is copolymerized from butadiene and acrylonitrile. Butyl rubber is copolymerized from isobutylene and a small percentage of isoprene. Non-polar rubbers include, but are not limited to, EP-type rubbers and EPDM, for example. Still other rubbers that can be used are styrenic block copolymers such as SEBS; VAE copolymer, wherein the vinyl acetate is present in an amount from 60-90% by weight, and chlorosulfonated polyethylene.

In a preferred embodiment of the present invention, the inner tube comprises at least nitrile rubber. Nitrile rubber as utilized herein refers to acrylonitrile butadiene rubber as well as hydrogenated nitrile butadiene rubber and carboxylated nitrile rubber. Nitrile rubber has an acrylonitrile content generally from about 25 to about 40 and preferably from about 32 to about 35 weight percent based on the total weight of acrylonitrile and butadiene in the nitrile rubber.

In various embodiments of the invention, the rubber utilized in the inner tube is cross-linked to a desired degree. The rubber is at least partially cross-linked utilizing any suitable cross-linking agent known to those of ordinary skill in the art. At least partial cross-linking produces rubber particles that yield improved processing characteristics over non-crosslinked rubbers and are readily dispersible in the thermoplastic matrix polymer. In some embodiments, the at least partially cross-linked rubber has a median particle size that ranges generally from about 0.1 to about 1.0 mm and preferably from about 0.2 to about 0.6. In preferred embodiments, the at least partially cross-linked rubber has a median particle size of less than 0.5 mm.

Suitable elastomers are available from many commercial sources including, but not limited to, nitrile rubber as ZEALLOY™ from Zeon Chemicals; as BAYMOD™ from Arlanxeo; NIPOL™ from Zeon Corporation and as CHEMIGUM™ from Synthomer under various designations.

The elastomer is present in the inner tube of the invention in an amount that ranges generally from about 30 to less than 100 phr, desirably in an amount from about 50 to about 95 phr and preferably in an amount from about 60 to about 90 phr (parts per hundred parts of the thermoplastic polymer).

In preferred embodiments of the invention, the inner tube also includes at least one plasticizer suitable for use with the thermoplastic polymer utilized in the composition of the inner tube. Plasticizers are included to make the composition softer and more flexible. Typical plasticizers for polyvinyl chloride polymers include ester plasticizers such as adipates, azelates, citrates, benzoates, phthalates, terephthalates, sebacates, and trimellitates.

The compositions of the inner tube of the present invention in various embodiments optionally include additives such as plasticizers in the form of a softener such as a mineral oil softener, or synthetic resin softener, a biorenewable softener such as vegetable oil, or combinations thereof. Various biorenewable softeners are disclosed for example in U.S. Publication 2014/0100311, herein incorporated by reference. The softener can beneficially reduce the temperatures at which the compositions are processable. Oil softeners are generally mixes of aromatic hydrocarbons, naphthene hydrocarbons and paraffin, i.e., aliphatic, hydrocarbons. Those in which carbon atoms constituting paraffin hydrocarbons occupy 50% by number or more of the total carbon atoms are called "paraffin oils". Those in which carbon atoms constituting naphthene hydrocarbons occupy 30 to 45% by number of the total carbon atoms are called "naphthene oils", and those in which carbon atoms constituting aromatic hydrocarbons occupy 35% by number or more of the total carbon atoms are called "aromatic oils". Examples of synthetic resin softeners include, but are not limited to, polyisobutylene, and polybutenes.

The inner tube composition includes a plasticizer or a combination of plasticizers, when present, in an amount generally from about 30 to about 150 phr, desirably in an amount from about 50 to about 110 phr and preferably in an amount from about 60 to about 90 phr.

The compositions of the inner tube of the present invention may include additional additives in varying amounts, including, but not limited to light stabilizers, antioxidants, flame retardant additives, pigments, heat stabilizers, processing aids, mold or die release agents, flow enhancing agents, nanoparticles, foam agents, platelet fillers and non-platelet fillers. Examples of fillers for use in the compositions include, but are not limited to, one or more of calcium carbonate, talc, clay, zeolite, silica, titanium dioxide, carbon black, barium sulfate, mica, glass fibers, whiskers, carbon fibers, magnesium carbonate, glass powders, metal powders, kaolin, graphite, and molybdenum disulfide. Suitable fillers also include bio-based fillers, e.g. various fibers, cellulose, and/or lignin.

In various embodiments of the invention, the inner tube has a hardness that ranges from 40 to 80 Shore A, desirably from 50 to 72.5 Shore A and preferably from 55 to 70 Shore A as measured according to ASTM D-2240. Providing the inner tube with a hardness in the indicated ranges produces a hose that balances flexibility at a wide range of temperatures with kink resistance.

Reinforcement Layer

The reinforcement layer 30 is located between and bonded to each of the inner tube 20 and outer layer 40. The reinforcement layer itself is a composite structure including both a textile layer and a polymer tie layer, with the textile layer preferably being imbedded or at least partially imbedded in the tie layer. In preferred embodiments, the textile layer is wholly embedded in the tie layer and therefore does not have any direct contact with inner tube 20 and outer layer 40.

In a highly preferred embodiment, reinforcement layer is constructed from a first tie layer 32 that is bonded to outer surface 24 of inner tube 20. A textile layer 34 is applied on the outer surface of tie layer 32. A second tie layer 36 is applied over the textile layer 34. Application of the tie layers 32 and 36, independently, can be performed by any suitable means such as spraying, coating, extrusion or the like, with extrusion being preferred.

In order to provide high bond strength between reinforcement layer 30, inner tube 20 and outer layer 40, the tie layer polymer(s) must be compatible with the polymers utilized in inner tube 20 and outer layer 40.

The polymer of the tie layer comprises at least a thermoplastic polymer. The thermoplastic polymers described hereinabove with respect to the inner tube are herein incorporated by reference. Polyvinyl chloride polymers are a preferred thermoplastic polymer of the tie layer. In some embodiments, the tie layer polymer includes an elastomer, such as described hereinabove with respect to the inner tube and incorporated by reference. In other embodiments, the tie layer is free of an elastomer.

The polymers of the tie layer are selected to enhance adhesion between layers. Polymers exhibiting a high degree of tackiness are preferred. The lower intrinsic viscosity of the polymer of the tie layer provides improved flow of the same between and/or around the yarns of the reinforcement layer.

In preferred embodiments, the tie layer composition includes at least one plasticizer which can make the tie layer composition softer and more flexible, while maintaining tackiness. Plasticizers described hereinabove with respect to the inner tube can be utilized and are herein incorporated by reference. The tie layer composition includes a plasticizer or combination of plasticizers, when present, in an amount generally from about 25 to about 75 phr, desirably in an amount from about 40 to about 70 phr and preferably in an amount from about 45 to about 65 phr.

In a preferred embodiment, the tie layer composition includes a lower amount of plasticizer as compared to each of the amount of plasticizers in the inner tube and the outer layer, individually.

The tie layer compositions may include additional additives such as described hereinabove with respect to the inner tube and are herein incorporated by reference.

In an important aspect of the invention, the tie layer composition is selected to have a hardness greater than the hardness of each of the inner tube and outer layer as measured according to ASTM D-2240. The hardness parameters have been discovered to provide an excellent balance between bondability and mechanical strength, with each being optimized in the construction and compositions described herein. In various embodiments, the tie layer composition has a hardness that ranges from 70 to 100 Shore A, desirably from 76 to 90 Shore A and preferably from 77 to 85 Shore A as measured according to ASTM D-2240.

The tie layer polymer or polymers is selected to have higher tack and adhesion as compared to the inner tube and the outer layer polymers. This is accomplished by using polymers in the reinforcement layer tie layer that have an intrinsic viscosity less than the IV of the polymers in each of the inner tube and outer layer. The polymer, preferably polyvinyl chloride polymer, utilized in the tie layer has an IV that ranges generally from about 0.50 to about 1.12, desirably from about 0.55 to about 0.95, and preferably from about 0.60 to about 0.85 when measured according to ASTM D-1243

The polymer, such as polyvinyl chloride polymer, of the tie layer is also characterized by a K-value. In various embodiments, the K-value ranges generally from about 50 to about 73, desirably from about 50 to about 68, and preferably from about 52 to about 65 when measured according to ISO 1628.

The textile layer is provided for reinforcing the inner layer. The textile layer includes at least one yarn formed from one or more same or different fibers. The fibers making up the yarns can be made from any material commonly used in the field. For example, it is possible to use natural or synthetic fibers. Suitable materials for fibers include, but are not limited to, cotton; polyolefin; polyester; aramid fibers such as Kevlar®, Nomex®, and Twaron®; polyether-ether-ketone fiber; carbon fiber; metallic fiber; polyamide; polyvinyl alcohol; and Rayon®. Polyester fibers are preferred in some embodiments.

The yarns, threads or the like of the textile layer can be arranged in any desired manner over the inner tube and preferably a first tie layer, as known to those of ordinary skill in the art.

The textile layer increases pressure resistance of the flexible hose, aids in reducing deformation, increases performance, and contributes to the burst resistance of the hose. As known in the art, a textile reinforcement layer in a flexible hose, if stressed, may elongate axially and/or enlarge radially, depending on the type of construction. Suitable textile layer patterns and constructions are known to those of ordinary skill in the art including, but not limited to, mesh reinforcement in which the textile layer is formed of a series of threads spirally wound around the flexible hose, preferably in parallel and equidistant rows and superimposed on an equal number of transverse threads along likewise substantially parallel equidistant lines which are arranged symmetrically with respect to the axis of the hose so as to form a mesh with a diamond-shaped cells. The yarns or fibers can be knitted or woven, or a combination thereof. Chain knitting generally includes a series of threads or yarns fed by multiple spools which are interlocked in both the weft direction and chain direction. Tricot chain-type knitting is also known in the art and describes a stitch in which each thread forms the stitch by inner weaving with one or more threads to its right and one or more threads to its left. Still other textile layers are described in U.S. Pat. Nos. 5,477,888, 6,199,594, and 8,770,233 herein fully incorporated by reference.

Outer Layer

Hose 10 includes outer layer 40 comprising an inner surface 42 bonded to reinforcement layer 30 and an outer surface 44 that is visible to the user. Outer layer 40 illustrated in FIG. 1 includes a decorative, ornamental appearance, being formed by a main, first section 45 that forms the majority of the outer layer, and two second sections 46 which are located outside of a window-like third section 48 formed of a third material that is clear or at least translucent enough to view one or more layers of the hose located therebeneath. The clear or translucent layer allows display of the textile layer when the tie layer is also clear or translucent. In one embodiment, the tooling contains a dam or barrier that blocks flow of the second or upper tie layer from the area where the third material is applied to the composite hose having the textile layer thereon. The design of the outer cover shown in FIG. 1 accentuates the appearance of the hose and draws attention to the textile layer.

In a preferred embodiment, the first section and second section have different colors due to the presence different of pigments and/or coloring agents. The third section materials preferably incorporate components that provide visibility through the outer layer. Thus, coloring pigments are preferably avoided in a third section. In a preferred embodiment the polymers utilized in each of the first, second and third sections 45, 46 and 48 are the same. In other embodiments, the outer layer 40 can be formed of a single composition such that the entire outer layer has a uniform appearance.

In a highly preferred embodiment the outer layer comprises at least the same two or more polymers that are present in the compositions utilized to form the inner tube.

Outer layer 40 includes a polymer composition comprising two or more polymers, with at least one polymer being a thermoplastic polymer. Like with inner tube 20, in highly preferred embodiments the polymer compositions of the outer layer 40 comprise both a thermoplastic polymer and an elastomer. In a preferred embodiment, the thermoplastic polymer is present in a major amount by weight based on the total weight of the polymer composition in the outer layer. The thermoplastic polymer forms a matrix in which any other polymer is present or dispersed. The thermoplastic polymers described hereinabove with respect to the inner tube can be utilized in the outer layer and are herein incorporated by reference. In a preferred embodiment, the outer layer comprises a polyvinyl chloride polymer.

The polymer, preferably polyvinyl chloride polymer, utilized in the outer layer has an IV that ranges generally from about 0.68 to about 1.25, desirably from about 0.80 to about 1.20, and preferably from about 0.90 to about 1.15 when measured according to ASTM D-1243. The IV of the outer layer polymer e.g. polyvinyl chloride, is greater than the IV of the polyvinyl chloride of the tie layer. In a preferred embodiment, the IV of the outer layer is generally within 25%, desirably within 15%, preferably within 10%, and most preferably within 5% of the IV of the inner tube.

In various embodiments, the K-value of the outer layer polymer such as polyvinyl chloride ranges generally from about 57 to about 78, desirably from about 60 to about 75, and preferably from about 67 to about 73 when measured according to ISO 1628. The K-value of the polyvinyl chloride of the outer layer is greater than the K-value of the polyvinyl chloride of the tie layer. In a preferred embodiment, the K-value of the outer layer thermoplastic polymer is generally within 15%, desirably within 10%, preferably within 5%, and most preferably within 2% of the K-value of the inner tube thermoplastic polymer.

The outer layer also includes an elastomer in preferred embodiments. Elastomers have been described hereinabove with respect to the inner tube that are incorporated by reference.

The elastomer is present in the outer layer of the invention in an amount that ranges generally from about 30 to less than 100 phr, desirably in an amount from about 50 to about 95 phr and preferably in an amount from about 60 to about 90 phr (parts per hundred parts of the thermoplastic polymer).

The outer layer preferably includes at least one plasticizer, wherein the plasticizers have been described hereinabove with respect to the inner tube and are also incorporated by reference. The outer layer composition includes a plasticizer or a combination of plasticizers, when present, in an amount generally from about 30 to about 150 phr, desirably in an amount from about 50 to about 110 phr and preferably in an amount from about 60 to about 90 phr.

The outer layer can also include one or more of the additives described hereinabove with respect to inner tube, which are herein incorporated by reference. The outer layer preferably includes additives designed to improve weathering performance. As known in the art, certain pigments, for example titanium dioxide and carbon black, can be utilized to improve UV stability. UV stabilizers can also be utilized. Additives such as biocides utilized in the outer layer can prevent growth of mold, mildew or other organisms on the outer surface of the hose.

In various embodiments of the invention, the outer layer has a hardness that ranges from about 40 to about 80 Shore A, desirably from about 50 to about 76 Shore A and preferably from about 55 to about 75 Shore A as measured according to ASTM D-2240. Providing the outer layer with a hardness in the indicated ranges produces a hose that balances flexibility at a wide range of temperatures with kink resistance. Hardness within the indicated ranges also contributes to durability, abrasion resistance and scuff resistance.

In a preferred embodiment, the hardness of the outer layer is generally within 24%, desirably within 22%, and preferably within 20% of the hardness of the inner tube. In one embodiment where the hose includes an outer layer having the first section, second section and third section, the first section has a hardness generally within 10%, desirably within 5% and preferably within 3% of the hardness of the inner tube. The second section has a hardness generally within 24%, desirably within 22% and preferably within 20% of the hardness of the inner tube. The third section has a hardness generally within 24%, desirably within 22% and preferably within 20% of the hardness of the inner tube.

Manufacturing Methods

Compositions suitable for being processed into the inner tube, tie layer, and outer layer are obtained. In various embodiments this involves combining and blending the polymers to be utilized with desired additives as noted hereinabove. The components of each layer are preferably independently mixed to a desired consistency utilizing conventional mixing equipment such as a ribbon blender, plow mixer, or high intensity or other mixer to achieve a preferably dry, free-flowing blend. The compositions can be melt mixed in equipment suitable for the polymers utilized. For PVC, suitable equipment includes a Banbury, Farrel continuous mixer, Buss co-kneader, and twin screw extruder.

The compositions are processed at a suitable temperature that does not degrade the components of the formulations. In one embodiment, conditions used by the melt mixing equipment yield a temperature between 320-395° F. (160° C.-202° C.). After melt mixing, the material is then fed in one embodiment, to an extruder and extruded, for example utilizing underwater pelletization or hot-face pelletization for example. Additionally, the material received from the melt mixing equipment can undergo additional processing through a two-roll mill and then dicing in a dicer system such as a Cumberland dicer. The mixed pellets are processed into the respective inner tube, tie layer and outer layer.

In one embodiment, the inner tube and a first tie layer are coextruded. The two melt streams are combined inside of a crosshead, formed into a tube shape by way of a tip and die, extruded and cooled to desired dimensions. The barrel zone temperatures of the individual extruders can independently range from about 145° C. to about 180° C. A screen pack is preferably used to build and maintain back pressure in the extruders. The coextrusion forms a composite tube having the first tie layer located on an outer surface of the inner tube.

The composite tube is braced with a textile layer. In one embodiment, the yarn is applied with knitters that weave a chain mesh stitch in a spiral pattern. Reinforcing density can be varied and have, for example, 6 to about 12 courses per inch.

A second tie layer is coextruded with the outer layer onto the textile layer and first tie layer which is exposed between interstices of fabric of the textile layer. Crosshead tooling is also utilized and the two or more melt streams of the tie layer and outer layer are combined therein along with the partially constructed composite hose having the textile layer thereon. When multiple different sections of an outer layer are desired, a manifold is utilized including threaded ports and multiple flow channels that direct the individual materials utilized to create the multiple sections into the correct orientation to produce the desired geometry on the extruded hose. In some embodiments a vacuum may be applied to the crosshead in order to improve adhesion.

Hose Attributes

The inner tube, reinforcement layer and outer layer each contribute to the cross-sectional thickness of the tube, i.e. distance between inner diameter and outer diameter of the hose. In a preferred embodiment, the inner tube is thicker than each of the tie layer and the outer layer. The inner tube preferably contributes to generally about 40% to about 60%, and desirably from about 45% to about 55% and preferably about 50% of the total thickness of the hose between the inner surface and outer surface thereof. The reinforcement layer preferably contributes to generally about 5% to about 15%, and desirably from about 7% to about 13% and preferably about 8% to 12% of the total thickness of the hose. The outer layer preferably contributes to generally about 30% to about 50%, and desirably from about 35 to about 45% of the total thickness of the hose.

The thickness of the reinforcement layer including the tie layer is generally from about 10% to about 30%, desirably from about 15% to about 25% and preferably from about 17% to about 23% of the thickness of the inner tube. The thickness of the reinforcement layer including the tie layer is generally from about 12% to about 32%, desirably from about 17% to about 27% and preferably from about 20% to about 25% of the thickness of the outer layer.

The thickness of the outer layer is generally from about 75% to about 95%, desirably from about 75% to about 95% and preferably from about 77% to about 85% of the thickness of the inner tube.

The specific arrangement and composition of each of the layers of the composite hose of the present invention contribute to the hose being relative light in weight as compared to some prior art standard construction-type hoses.

In one embodiment, a 50 foot length of hose has a weight that ranges from about 4.4 to about 6.4 lbs and preferably from about 5.0 to about 5.8 lbs.

EXAMPLES

The examples set forth below are provided to illustrate the features of the hoses of the invention and are not intended to limit the scope of the invention.

Hoses were prepared including the components and properties set forth in the chart below.

| | Thickness(Target) | Hardness | IV | K-value |
|---|---|---|---|---|
| Inner Tube<br>PVC<br>Nitrile rubber<br>Plasticizer | 0.055 or 0.050 | PVC less than tie layer PVC | PVC IV greater than the tie layer PVC IV | PVC K-value greater than the tie layer PVC K-value |
| Reinforcement<br>Textile Layer<br>Polyester<br>Chain mesh stitch in a spiral pattern, 8 courses per inch.<br>Tie Layer<br>PVC<br>Plasticizer | 0.010 | PVC greater than inner tube PVC and outer layer PVC | PVC IV less than inner tube PVC and less than outer layer IV | PVC K-value less than inner tube PVC and less than outer layer K-value |
| Outer Layer<br>PVC<br>Nitrile Rubber<br>Plasticizer | 0.045 | PVC less than the tie layer PVC | PVC IV greater than the tie layer PVC IV | PVC K-value greater than the tie layer PVC IV |

As evident from the above chart, the hoses had a multi-layer construction including an inner tube; reinforcement layer, including a textile layer and tie layer; and an outer layer. The inner diameter of the hoses was about 0.50 inch. The outer diameter was about 0.72 inch. Half of the thickness of the tie layer was applied to the inner tube followed by weaving of the textile layer on the first tie layer. Thereafter, the second half of the tie layer was applied over the textile layer. The outer layer exhibited the construction shown in FIG. 1 and included a clear window bordered by a stripe on each side thereof. The width of the window was about 0.20 inch. The width of each border stripe was about 0.10 inch. The remainder of the outer layer was disposed adjacent the border stripes. The hoses had a weight per length of about 5.70 lbs. per 50 ft., (0.114 lbs. per ft. average) or 5.40 lbs. per 50 ft (0.108 per ft. average).

Testing on the hoses show that they contain many attributes that are desired by end users. The test results below highlight some of the advantages.

| Flow Rate | Results Q3 |
|---|---|
| Inventive hose | 7.6 |
| Comparative hose | 8.1 |

This test was performed with a flow rate setpoint of 8 GPM target. A 50 FT length of hose was tested and the resulting flow rate was recorded. Flow rate readings were collected every 10 seconds over a 500 second test period.

The test hose had a 75$^{th}$ Percentile flow rate observed at 7.6 GPM. A comparable Teknor Apex Neverkink® hose with a ⅝" inner diameter subjected to the same test conditions had a flow rate observed at 8.1 GPM. The flow rate of the test hose is comparable to the ⅝" hose.

| Light weight | Results | | | | | |
|---|---|---|---|---|---|---|
| | 1 | 2 | 3 | 4 | 5 | AVG |
| 2 FT Weight (Intact) | 84.8 | 85.4 | 85.2 | 85.1 | 86.1 | 85.32 |

Conventional ⅝" hoses typically weigh between 7-11 LBS/50 FT depending on material type. The units in the table above are grams/2 FT. The average weight converts to about 4.70 LBS/50 FT, which is well below the weight per length of comparable conventional ⅝" hoses.

| Durability - Adhesion | | | | |
|---|---|---|---|---|
| | Results | | | |
| | 1 | 2 | 3 | AVG |
| Adhesion, 50 MIL | >50 | >50 | >50 | >50 |

Adhesion is a measure of the bond strength between inner tube and outer covering. The units are LBS-F. The higher the number the stronger the outer covering and inner tube are bonded together. 10 LBS-F is one measure of a minimum value for acceptable adhesion. Accordingly, the tested hose exhibited excellent adhesion between the inner tube and outer cover.

| Durability - Carousel Abrasion | | | | |
|---|---|---|---|---|
| | Results | | | |
| | 1 | 2 | 3 | AVG |
| Carousel Abrasion, 50 MIL, 3X | 18 | 18 | 19 | 18 |

The test abraded a pressurized hose sample against a 40 Grit sandpaper surface with a known weight applied to the sample. The sample travels in a circular path. The number reported above is the number of revolutions the hose survives before failing.

| Durability - Burst | | | | | | |
|---|---|---|---|---|---|---|
| | Results | | | | | |
| | 1 | 2 | 3 | 4 | 5 | AVG |
| Instant Burst, 50 MIL | 343 | 357 | 352 | 351 | 358 | 352.2 |

The values above are instantaneous burst in PSI. Thus, the inventive hose had an instantaneous burst well above conditions typically encountered by garden p namely between 30 psi and 80 psi which is standard water pressure in the U.S.

| Durability - Puncture Resistance | | | | |
|---|---|---|---|---|
| | Results | | | |
| | 1 | 2 | 3 | AVG |
| Puncture, 50 MIL, 3X | 79 | 85 | 83 | 82 |

This product has excellent puncture resistance due to the elastomer content of the inner tube and outer layer. Comparable PVC-based hoses typically have values of 60-70 LBS-F.

| Durability - Low Temperature Flex Cycle Performance | | | | |
|---|---|---|---|---|
| | Results | | | |
| Tests | 1 | 2 | 3 | AVG |
| Inventive hose | 1771 | 2273 | 1772 | 1939 |
| PVC hose | 1000 | 1000 | 1300 | 1100 |

Low temperature flex cycle testing is a proprietary test developed by Teknor Apex. The test measures the number of bends required to cause a hose to leak. The test hoses averaged 1939 bends in this test compared to a PVC hose.

| Flexibility - Ambient | | | | |
|---|---|---|---|---|
| | Results | | | |
| | 1 | 2 | 3 | AVG |
| Ambient Flex, 50 MIL | 2 | 2.2 | 2.3 | 2.1 |

This test method quantifies the peak force required to deflect a hose sample 2". The units are LBS-F. The test hoses have a value of 2.1 LBS-F. ⅝" NeverKink® hoses from Teknor Apex have values of 10-13 LBS-F in this test.

| Flexibility - 0° C. | | | | |
|---|---|---|---|---|
| | Results | | | |
| | 1 | 2 | 3 | AVG |
| 0° C. Flex, 50 MIL | 4.8 | 5.8 | 5.6 | 5.4 |

This is the same test as described above. However, the test hoses were conditioned in a laboratory freezer for a minimum of 4 hours prior to testing. The test hoses exhibited an average value of 5.4 LBS-F. ⅝" NeverKink® hoses from Teknor Apex commonly have values of 35-45 LBS-F in this same test.

| Torsional Kink Resistance (U.S. Pat. No. 9,638,613) | | | |
|---|---|---|---|
| | Results | | |
| | 1 | 2 | AVG |
| Torsion with flow 1500D MIL 2 GPM | 711 | 731 | 721 |

Teknor Apex developed and patented a machine to measure and quantify the degrees of rotation required to reduce water flow through a hose. This machine is useful in quantifying torsional kink resistance of a given hose construction. The test hoses required over 700 degrees of rotation to reduce water flow to 2 GPM. Comparable constructions typically average 180-500 degrees depending on hose construction characteristics.

Length Change Under High Pressure

A 50 foot long section of hose was tested to determine length change under pressure. The hose was measured at 0 psi and 72.5 psi as indicated in the table below. The hose was allowed to equilibrate for the times indicated.

| Internal Pressure | Total Length (INCHES) | | | | | |
|---|---|---|---|---|---|---|
| (PSI) | Instant | 2 MIN | 5 MIN | 10 MIN | 30 MIN | 60 MIN |
| 0 PSI | 597.5 | | | | | |
| 72.5 PSI | 555 | 547 | 545 | 540 | 538 | 537 |
| % Shrink | 7.1% | 8.5% | 8.8% | 9.6% | 10.0% | 10.1% |

The results show that hoses of the invention can decrease slightly in length under pressure.

Outer Diameter Change by Pressure

A 25 foot length of hose was tested. Five points along the length of the hose were marked. The outside diameter of the hose at each point was measured at the pressure indicated. The hose was allowed to equilibrate at each pressure condition for two minutes before measuring the hose at each pressure change.

| Internal Pressure (PSI) | Outside Diameter (Inches) 1 | 2 | 3 | 4 | 5 | AVG | NOTES: | Diameter Increase |
|---|---|---|---|---|---|---|---|---|
| 0 PSI | 0.665 | 0.660 | 0.675 | 0.680 | 0.674 | 0.671 | Measured side opposite of window | |
| 10 PSI | 0.685 | 0.690 | 0.694 | 0.685 | 0.675 | 0.686 | | 1.02 |
| 20 PSI | 0.690 | 0.695 | 0.700 | 0.700 | 0.690 | 0.695 | | 1.04 |
| 30 PSI | 0.712 | 0.710 | 0.722 | 0.725 | 0.708 | 0.715 | | 1.07 |
| 40 PSI | 0.730 | 0.735 | 0.742 | 0.747 | 0.740 | 0.739 | | 1.10 |
| 50 PSI | 0.758 | 0.752 | 0.765 | 0.760 | 0.752 | 0.757 | | 1.13 |
| 60 PSI | 0.778 | 0.775 | 0.795 | 0.788 | 0.775 | 0.782 | | 1.17 |
| 70 PSI | 0.808 | 0.805 | 0.825 | 0.812 | 0.802 | 0.810 | | 1.21 |
| 80 PSI | 0.820 | 0.820 | 0.844 | 0.838 | 0.825 | 0.829 | | 1.24 |

In combination with the length change experiment, it is clear that the hoses of the invention can increase slightly in diameter while contracting in length due to the unique construction of the hose. This combination provides the hose with excellent flow rates.

As evident from the test results set forth above, the hoses of the invention exhibit high water flow, are lightweight as compared to at least some commercial hoses, have excellent durability, flexibility at a wide range of temperatures, and kink resistance. Durability includes excellent adhesion between layers, abrasion resistance, burst strength, puncture resistance, low temperature, and flex cycle performance.

For the avoidance of doubt, the compositions, hoses and methods of the present invention encompass all possible combinations of the components, including various ranges of said components, disclosed herein. It is further noted that the term 'comprising' does not exclude the presence of other elements. However, it is also to be understood that a description of a product comprising certain components also discloses a product consisting of these components. Similarly, it is also to be understood that a description on a process comprising certain steps also discloses a process consisting of these steps.

In accordance with the patent statutes, the best mode and preferred embodiment have been set forth; the scope of the invention is not limited thereto, but rather by the scope of the attached claims.

What is claimed is:

1. A hose for lawn and garden use, comprising:

an inner tube having a longitudinal length and an inner surface defining a water passage between a first and a second end of the hose, the inner tube comprising a polymer composition comprising a first polyvinyl chloride polymer and an elastomer, wherein the first polyvinyl chloride polymer is present in a major amount by weight based on a total weight of the polymer composition of the inner tube;

a reinforcement layer bonded to an outer surface of the inner tube, wherein the reinforcement layer comprises i) a textile layer comprising yarns and ii) a tie layer comprising a second polyvinyl chloride polymer different than the first polyvinyl chloride polymer;

an outer layer bonded to an outer surface of the reinforcement layer and comprising a polymer composition comprising a third polyvinyl chloride polymer and an elastomer, wherein the third polyvinyl chloride polymer is present in a major amount by weight based on a total weight of the outer layer polymer composition, wherein the third polyvinyl chloride polymer is different than the second polyvinyl chloride polymer; and i) wherein the second polyvinyl chloride polymer of the reinforcement layer has an intrinsic viscosity less than the intrinsic viscosity of the first polyvinyl chloride polymer and the third polyvinyl chloride polymer, and ii) wherein the first polyvinyl chloride polymer and the third polyvinyl chloride polymer have a K-value greater than the second polyvinyl chloride polymer, and iii) wherein the inner tube and the outer layer each have a hardness less than the hardness of the tie layer.

2. The hose according to claim 1, wherein the textile layer is embedded in the tie layer, wherein the textile layer does not have direct contact with the inner tube and the outer layer.

3. The hose according to claim 1, wherein a difference in length of a 25 foot length of the hose, in an unpressurized state or ambient state is less than 25% as compared to the length of the hose in a pressurized state at 80 psi, or less than 20% at 60 psi or less, or less than 15% at 50 psi or less, or less than 10% at 30 psi or less.

4. The hose according to claim 1, wherein a 50 foot length of the hose pressurized with water at 72.5 psi and allowed to equilibrate for 30 minutes retracts less than 15%.

5. The hose according to claim 1, wherein the inner tube elastomer comprises nitrile rubber, and wherein nitrile rubber is present in an amount from 40 to less than 100 parts based on 100 parts by weight of the first polyvinyl chloride polymer.

6. The hose according to claim 1, wherein the first polyvinyl chloride polymer has an intrinsic viscosity that ranges from 0.68 to 1.25 and a K-value that ranges from 57 to 78, wherein the second polyvinyl chloride polymer has an intrinsic viscosity that ranges from 0.50 to 1.12 and a K-value that ranges from 50 to 73, and wherein the third polyvinyl chloride polymer has an intrinsic viscosity that ranges from 0.68 to 1.25 and a K-value that ranges from 57 to 78.

7. The hose according to claim 1, wherein the first polyvinyl chloride polymer has an intrinsic viscosity that ranges from 0.90 to 1.15 and a K-value that ranges from 67 to 73, wherein the second polyvinyl chloride polymer has an intrinsic viscosity that ranges from 0.60 to 0.85 and a K-value that ranges from 52 to 75, and wherein the third polyvinyl chloride polymer has an intrinsic viscosity that ranges from 0.90 to 1.15 and a K-value that ranges from 67 to 73.

8. The hose according to claim 1, wherein the inner tube and outer layer each comprise a plasticizer, and wherein the reinforcement layer is free of an elastomer.

9. The hose according to claim 1, wherein the first polyvinyl chloride polymer has a hardness that ranges from 40 to 80 Shore A, wherein the second polyvinyl chloride polymer has a hardness that ranges from 70 to 100 Shore A and the third polyvinyl chloride polymer has a hardness that ranges from 40 to 80 Shore A.

10. The hose according to claim 1, wherein the first polyvinyl chloride polymer has a hardness that ranges from 55 to 70 Shore A, wherein the second polyvinyl chloride polymer has a hardness that ranges from 77 to 84 Shore A and the third polyvinyl chloride polymer has a hardness that ranges from 55 to 75 Shore A.

11. The hose according to claim 2, wherein a difference in length of a 25 foot length of the hose, in an unpressurized state or ambient state is less than 25% as compared to the length of the hose in a pressurized state at 80 psi, or less than 20% at 60 psi or less, or less than 15% at 50 psi or less, or less than 10% at 30 psi or less.

12. The hose according to claim 11, wherein a 50 foot length of the hose pressurized with water at 72.5 psi and allowed to equilibrate for 30 minutes retracts less than 15%.

13. The hose according to claim 12, wherein the inner tube elastomer comprises nitrile rubber, and wherein nitrile rubber is present in an amount from 40 to less than 100 parts based on 100 parts by weight of the first polyvinyl chloride polymer.

14. The hose according to claim 13, wherein the first polyvinyl chloride polymer has an intrinsic viscosity that ranges from 0.68 to 1.25 and a K-value that ranges from 57 to 78, wherein the second polyvinyl chloride polymer has an intrinsic viscosity that ranges from 0.50 to 1.12 and a K-value that ranges from 50 to 73, and wherein the third polyvinyl chloride polymer has an intrinsic viscosity that ranges from 0.68 to 1.25 and a K-value that ranges from 57 to 78.

15. The hose according to claim 14, wherein the first polyvinyl chloride polymer has an intrinsic viscosity that ranges from 0.90 to 1.15 and a K-value that ranges from 67 to 73, wherein the second polyvinyl chloride polymer has an intrinsic viscosity that ranges from 0.60 to 0.85 and a K-value that ranges from 52 to 75, and wherein the third polyvinyl chloride polymer has an intrinsic viscosity that ranges from 0.90 to 1.15 and a K-value that ranges from 67 to 73.

16. The hose according to claim 15, wherein the inner tube and outer layer each comprise a plasticizer, and wherein the reinforcement layer is free of an elastomer.

17. The hose according to claim 16, wherein the first polyvinyl chloride polymer has a hardness that ranges from 40 to 80 Shore A, wherein the second polyvinyl chloride polymer has a hardness that ranges from 70 to 100 Shore A and the third polyvinyl chloride polymer has a hardness that ranges from 40 to 80 Shore A.

18. The hose according to claim 17, wherein the first polyvinyl chloride polymer has a hardness that ranges from 55 to 70 Shore A, wherein the second polyvinyl chloride polymer has a hardness that ranges from 77 to 84 Shore A and the third polyvinyl chloride polymer has a hardness that ranges from 55 to 75 Shore A.

19. A method for producing the hose according to claim 1, comprising the steps of:

coextruding the inner tube and a first layer of the tie layer, wherein the first layer of the tie layer is present on an outer surface of the inner tube;

weaving the textile layer on the first layer of the tie layer; and coextruding a second layer of the tie layer onto the textile layer and the outer layer onto the second layer of the tie layer to form the hose.

* * * * *